(No Model.)
P. J. EGAN.
PICTURE HANGER.
No. 365,676. Patented June 28, 1887.
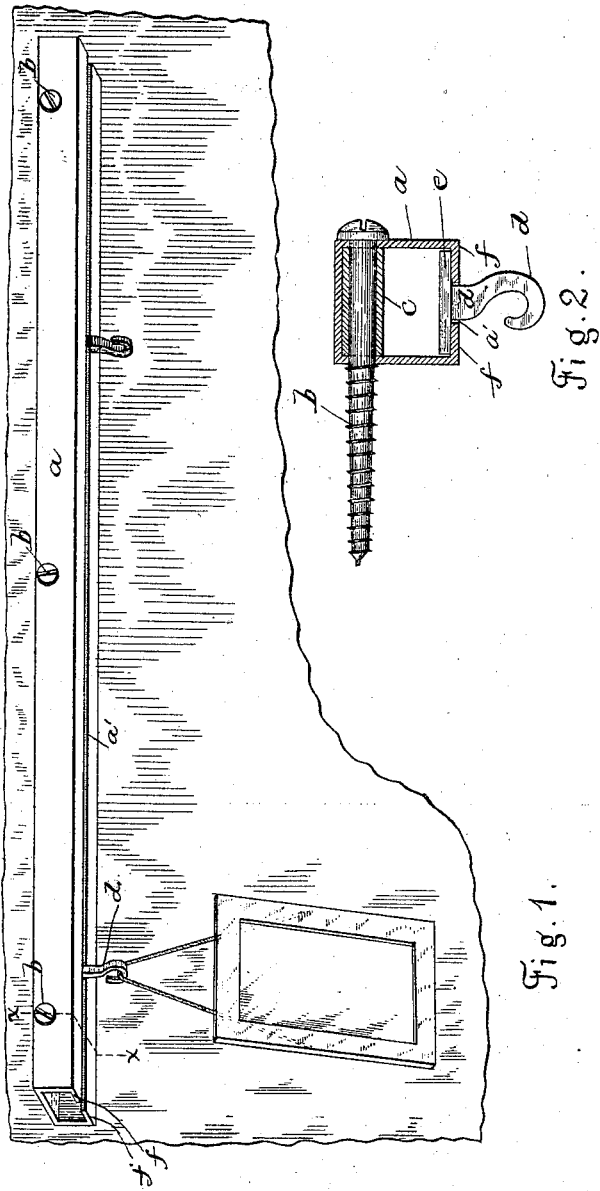
Witnesses:
Walter F. Rogers.
H Brown
Inventor:
Patrick J. Egan,
by Wight, Brown & Crosley.
attorneys.

UNITED STATES PATENT OFFICE.

PATRICK J. EGAN, OF BOSTON, MASSACHUSETTS, ASSIGNOR OF ONE-HALF TO J. DUDLEY RICHARDS, OF SAME PLACE.

PICTURE-HANGER.

SPECIFICATION forming part of Letters Patent No. 365,676, dated June 28, 1887.

Application filed September 30, 1886. Serial No. 214,936. (No model.)

*To all whom it may concern:*

Be it known that I, PATRICK J. EGAN, of Boston, in the county of Suffolk and State of Massachusetts, have invented certain new and useful Improvements in Picture-Hangers, of which the following is a specification.

My invention relates to devices for holding picture-hooks for hanging pictures and similar articles.

It is the object of the invention to provide a contrivance of the character mentioned which shall be at once strong, convenient for and in use, "sightly" in appearance, and, considering these qualities, cheap of manufacture.

To the foregoing ends my invention consists in a metallic tube or hollow bar provided with a longitudinal slit and a picture-hook provided with a head adapted to be received and to slide in said tube, said hook having a shank extending through said slit, and the tube being adapted to be secured to a wall, partition, or similar support in a room or gallery by means of holes extending transversely therethrough at suitable intervals, with short tubes or equivalent devices adapted to receive the shanks of the screws inserted through said holes to prevent the pinching of the shank of the hook between the edges of the slit, the construction and arrangement being such that the head of the hook may be inserted in the tube and said hook be moved to any position along the length of the tube, the laterally-extending flanges or parts of which adjacent to the slit engage the hook-head and sustain or hold it and the picture suspended by a cord therefrom.

I will now proceed to describe my invention, so that others skilled in the art may be able to make and use the same, reference being had to the accompanying drawings, forming a part of this specification, and the invention being particularly pointed out in the claims appended to the explanation of the construction and operation of the device.

Of the drawings, Figure 1 represents a perspective view of my improvement secured in position, showing a picture sustained by a cord attached to the hook. Fig. 2 is a cross-section of the invention on the line $x\ x$, Fig. 1, showing the character and relationship of the several parts.

Similar letters of reference indicate similar parts in both figures.

In carrying out my invention I take a metal or hollow bar, $a$, preferably of rectangular form in cross-section, as shown, and form a slit, $a'$, along the length thereof of a width sufficient to permit the shank $d'$ of the hook $d$ to slide therein without binding on the sides, as shown. The hook $d$ is provided with a head, $e$, adapted to rest on the laterally-projecting portions $f$ of the tube adjacent to the slit $a'$, by which said hook is sustained in position.

To secure the sustaining bar or tube to a wall, partition, or other sustaining means, I provide the tube with holes extending transversely therethrough at suitable intervals in the part above the point where the slit $a'$ is formed, through which screws $b$ may be inserted and screwed into the wall or partition. To prevent the edges $f\ f$ from being pressed toward each other, and thus pinching the shank $d'$ of the hook between them, I provide spacing-pieces $c$, consisting of short tubes adapted to receive the shank of the screws therethrough, and have their ends rest against the inside of the tube. It is preferred to solder or otherwise secure these spacing-pieces in place or position. By this construction the tube $a$ and hooks $d$ are relieved of all torsional strain, which would not be the case if the tube were so arranged as to make the shank of the hook extend out horizontally through the slit, and the shank of the hook is prevented from being cramped or pinched between the edges of the slit through which it extends, as would result if no provision were made thereagainst, as is done by the spacing-pieces $c$ or equivalent devices. It is of course not essential that the tube $a$ should be square in form in cross-section, as represented, as it is obvious that forms varying from this would answer the same purpose.

In use the head $e$ of the hook $d$ will be slipped into the tube $a$ from the end, with the shank $d'$ depending through the slit $a'$.

By my invention a device for holding picture-hooks is provided occupying but little room, which permits of it being secured to a very narrow strip or at points where a "molding" of ordinary width could not be attached, and the spacing-pieces $c$ prevent the screw from pinching the flanges or parts $ff$ on the shank of the hook $d$, so that the latter can be freely moved from place to place anywhere along the tube. I thus overcome an objection heretofore experienced in attaching a picture-hook-supporting tube having the same form in cross-section by passing the screws through from front to rear of the tube, as shown in the drawings. Furthermore, by constructing the device of metal a picture-hook support of great strength is obtained, and one which, being constructed of brass or other metal, or plated, may be made quite ornamental.

The ease with which the hooks $d$ may be moved from point to point along the tube or bar $a$ by reason of the spacing-pieces $c$ or equivalent devices, which prevent the shank of the hook from being pinched between the flanges $ff$, adapts the invention to other uses than that of supporting picture-hooks. It may, for example, be employed to sustain curtains or portières wherever such articles are used, and for other analogous purposes.

Having thus described my invention, what I claim is—

1. A picture-hook-sustaining device consisting of a metallic tube or hollow bar provided with a longitudinal slit adapted to receive the shank of a hook therethrough, and having holes formed therethrough at intervals along its length, and provided with the spacing-pieces $c$, to receive screws for attaching the tube or bar to its support, all substantially as hereinbefore set forth.

2. The metallic tube or bar provided with a longitudinal slit and having holes formed transversely therethrough at intervals along its length, spacing-pieces $c$, screws $b$, and hooks $d$, provided with the head $e$ and shank $d'$, extending through the slit, all constructed, combined, and arranged substantially as hereinbefore set forth.

In testimony whereof I have signed my name to this specification, in the presence of two subscribing witnesses, this 27th day of September, A. D. 1886.

PATRICK J. EGAN.

Witnesses:
ARTHUR W. CROSSLEY,
A. D. HARRISON.